3,635,950
N-ADAMANTYL-3-AZETIDINOL AND
DERIVATIVES THEREOF
Elijah H. Gold, West Orange, N.J., assignor to
Schering Corporation, Bloomfield, N.J.
No Drawing. Filed Oct. 11, 1968, Ser. No. 766,936
Int. Cl. C07d 25/00
U.S. Cl. 260—239 A   7 Claims

ABSTRACT OF THE DISCLOSURE

Disclosed herein are N-adamantyl-3-azetidinols and certain derivatives thereof. These novel compounds are useful in prophylactically treating certain viral infections.

---

This invention relates to compositions of matter which may be considered chemically as N-adamantyl-3-azetidinols and to processes for making and using such compositions.

The invention sought to be patented in one of its composition aspects is described as residing in a concept of a chemical compound having the molecular structure of azetidine in which the ring nitrogen atom is substituted with an adamantyl radical and in which the 3-carbon atom in the ring is substituted with a hydroxyl group and optionally also with a phenyl or lower alkyl group. These compounds may optionally have a lower alkyl radical substituted in each of the 2 and 4 carbon atom positions in the azetidine ring. Also included within this concept are the pharmaceutically acceptable acylates of these 3-hydroxy compounds and pharmaceutically acceptable acid addition salts.

The invention sought to be patented in another of its composition aspects resides in the concept of a pharmaceutical invention containing a novel composition of matter of this invention.

The invention sought to be patented in one of its process aspects is described as residing in those concepts which comprise protecting against (prophylactically treating) a viral infection, particularly of the influenza type, in a mammal by administering thereto an effective quantity of a novel composition of matter of this invention.

In another of its process aspects, this invention relates to the preparation of N-adamantyl-3-azetidinols by the condensation of an epihalohydrin and aminoadamantane.

A more specific representation of the tangible embodiments of this invention are the chemical compositions having the structural formula:

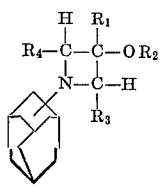

(I)

wherein $R_1$ is hydrogen, lower alkyl, or a phenyl radical; $R_2$ is hydrogen or a pharmaceutically acceptable acyl radical; $R_3$ and $R_4$ are hydrogen or lower alkyl and pharmaceutically acceptable acid addition salts thereof. As is apparent from Formula I, the adamantyl group can be attached through either its 1- or 2-carbon atom to the azetidine ring. Preferably the adamantyl moiety is attached through its 1-carbon atom to the azetidine ring. For convenience the adamantyl group may be depicted hereinafter as Ad-.

The lower alkyl radicals referred to above may be straight or branched chain and may include, as for example, methyl, ethyl, n-propyl, n-butyl and the like. The lower alkyl radicals may be functionally substituted, as for exampe, with a hydroxyl group. Similarly, when $R_1$ is a phenyl ring, it may be substituted with various functional groups such as fluorine, chlorine, bromine, lower alkyl, hydroxy, lower alkoxy or trifluoromethyl.

The $R_2$ acyl radicals may be derived from such normally pharmaceutically acceptable acids as monobasic lower alkyl carboxylic acids such as acetic, propionic, butyric and isobutyric; and polybasic organic acids such as succinic, maleic, tartaric and citric acid. The preferred acyl group is a lower alkanoyl radical, i.e. those having 1 to 6 carbon atoms, e.g. formyl, acetyl, propionyl, isobutyryl, valeryl and caproyl. Most preferably the acyl group is acetyl.

Exemplary of pharmaceutically acceptable acid addition salts of compounds of Formula I are those formed with maleic, fumaric, succinic, tartaric, citric, malic, cinnamic, sulfonic, hydrochloric, hydrobromic, sulfuric, phosphoric and nitric acids. The acid addition salts may be prepared in the conventional manner, by treating a solution or suspension of the free base in an organic solvent with the desired acid, and then recovering the salt which forms by crystallization techniques.

The compounds of this invention can be prepared by condensing 1- or 2-aminoadamantane with the corresponding epihalohydrin (II) as follows:

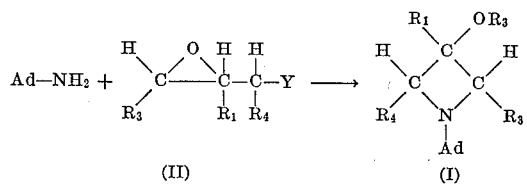

wherein $R_1$, $R_2$, $R_3$, $R_4$ and Ad have the meanings described above and Y is chlorine or bromine. This condensation is generally conducted in a polar organic solvent such as dimethylformamide, dimethylsulfoxide or methanol. The intermediate aminohalopropanol is preferably not isolated but rather directly cyclized by heating at about 45–60° C. for several days.

The compounds of this invention can also be formed by alkylating the free azetidinol (III) as follows:

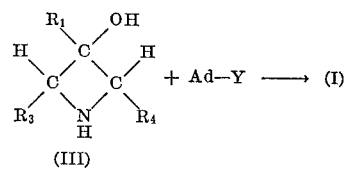

wherein $R_2$, $R_3$, $R_4$, Ad and Y are above described. This reaction can be carried out in an autoclave under autogenous pressure using an excess of aminoadamantane, e.g. a 2:1 molar ratio. Elevated temperatures are employed, e.g. 250° C., and the reaction is conducted over the course of several hours, e.g. 16 hours. In another embodiment this reaction can be carried out in a polar solvent such as methanol or dimethylformamide and in the presence of a suitable protor acceptor such as potassium carbonate.

The free azetidinol III can be prepared as described in my copending aplication Ser. No. 741,205. Therein an epihalohydrin of the Formula IV is condensed with a substituted benzyl amine of the Formula V, followed by removal of the group attached to the nitrogen atom of the condensate VI as follows:

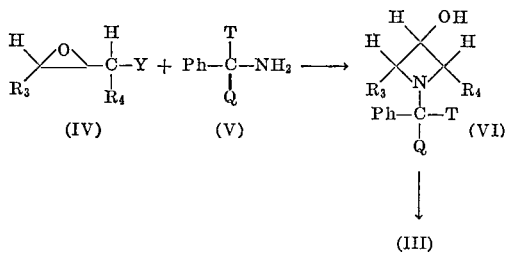

wherein $R_3$ and $R_4$ have the meanings described above, Y is chlorine or bromine, Ph is a phenyl radical, Q is hydrogen, a lower alkyl radical or a phenyl radical, and T is a lower alkyl radical or a phenyl radical.

The condensation reaction between IV and V is generally conducted in a polar organic solvent such as dimethylformamide, dimethylsulfoxide or methanol. The intermediate aminohalopropanol is preferably not isolated but rather directly cyclized by heating at about 45–50° C. for several days. The resulting condensate VI can be converted into the free azetidinol III as, for example, by hydrogenation over a palladium catalyst in a suitable solvent such as ethanol. When V is tritylamine (i.e. Q and T are phenyl), the trityl group can be removed simply by hydrolysis under acid conditions to form the free azetidinol III.

The acylated N-adamantyl-3-azetidinols, i.e. those compounds of Formula I wherein $R_2$ is acyl, can be prepared by reacting the corresponding N-adamantyl-3-azetidinol with the appropriate acylating agent in the manner conventional for such acylation. For example, to prepare the 3-acetoxy analogue, one can employ acetic anhydride.

The following examples illustrate the preparation of representative compounds of this invention.

EXAMPLE 1

Preparation of 1-(1-adamantyl)-3-azetidinol

Stir a mixture of 45.4 g. (0.3 mole) of 1-aminoadamantane, 27.5 g. (0.3 mole) of epichlorohydrin and 72 g. of dimethylsulfoxide at room temperature for 24 hours, and then continue stirring at ca. 55° C. for one week. Dissolve the mixture in 250 ml. of hot methanol, pour the resulting solution into 200 ml. of 10% aqueous sodium hydroxide and then add 500 ml. of water. Extract the resulting mixture once with 300 ml. of methylene chloride and then twice with 150 ml. portions of methylene chloride. Wash the methylene chloride extract twice with 150 ml. portions of saturated aqueous sodium chloride, dry over sodium sulfate, filter, remove the solvent, recrystallize the resulting oily solid from chloroform-hexane and obtain the product of this example, M.P. 173–173.5° C.

To 4.0 g. of this product in a mixture of 50 ml. of chloroform and 150 ml. of ether, add 10 ml. of 3.5 N ethereal hydrogen chloride and obtain 4.3 g. of hydrochloride salt, M.P. 212–212.5° C. (decomp.)

EXAMPLE 2

Alternate preparation of 1-(1-adamantyl)-3-azetidinol

In a high pressure stainless steel bomb charge 43.8 g. (0.6 mole) of 3-azetidinol and 64.6 g. (0.3 mole) of 1-bromoadamantane and heat for 16 hours at ca. 250° C. Cool to room temperature, dissolve the crude reaction mixture in 200 ml. of hot methanol. Pour the resulting solution into 200 ml. of 10% aqueous sodium hydroxide and continue the work up procedure as described in Example 1.

EXAMPLE 3

Preparation of 1-(1-adamantyl)-3-phenyl-3-azetidinol

Stir a mixture of 26.9 g. (0.18 mole) of 1-amino-adamantane, 30.0 g. (0.18 mole) of 3-chloro-1,2-epoxy-2-phenylpropane and 57 g. of dimethylsulfoxide at room temperature for 24 hours, and then continue stirring at ca. 55° for one week. Dissolve the mixture in 100 ml. of hot methanol, pour the resulting solution into 400 ml. of water and extract three times with 125 ml. portions of ether. Wash the ether extract twice with 100 ml. portions of water and once with 100 ml. of saturated aqueous sodium chloride, dry over sodium sulfate, filter, remove the solvent and recrystallize the resulting oily solid from hexanemethylene chloride and obtain 17.2 g. of the product of this example, M.P. 133.5–134° C.

To 2.0 g. of this product in a mixture of 25 ml. of methylene chloride and 100 ml. of ether, add 5 ml. of 3.5 N ethereal hydrogen chloride and obtain 2.2 g. of the hydrochloride salt, M.P. 219–219.5° C. decomp.)

EXAMPLE 4

Alternate preparation of 1-(1-adamantyl)-3-phenyl-3-azetidinol

In a high pressure stainless steel bomb charge 44.8 g. (0.3 mole) of 3-phenyl-3-azetidinol and 32.2 g. (0.15 mole) of 1-bromoadamantane and heat for 16 hours at ca. 250° C. Cool to room temperature, dissolve the crude reaction mixture in 100 ml. of hot methanol and continue the work up as described in Example 3.

EXAMPLE 5

Preparation of 1-1(1-adamantyl)-3-acetoxyazetidine

Heat a mixture of 5.23 g. (0.025 mole) of 1-(1-adamantyl)-3-azetidinol and 3.4 g. (0.037 mole) of acetic anhydride at 115° C. for 30 minutes. Cool to room temperature, pour into 50 ml. of an ice cold solution of 10% sodium carbonate and extract twice with 100 ml. portions of ether. Wash the ether extract twice with 75 ml. portions of water, dry over sodium sulfate, remove the ether and obtain 3.7 g. of the product of this example (B.P.$^{0.01}$ 108–111° C.).

Treat 3.5 g. of this product in 50 ml. of ether with 5.0 ml. of 3.5 N ethereal hydrogen chloride and obtain 3.6 g. of the hydrochloride salt. After recrystallization from ethanol-ethyl acetate it exhibits decomposition over a ten degree range beginning at ca. 172° C.

While amantadine itself has been widely taught to be an antiviral agent, its efficacy is generally considered to be relatively inconsistent and unpredictable. For reasons which are not fully understood, reliably reproducible results have not been characteristic of amantadine. In tests with mice, the compounds of this invention appear to exhibit more reliable and consistent antiviral prophylactic activity than does amantadine against, for example, influenza viruses $A_2$ (Jap. 305/57) and PR8 (A/PR8).

Using standard techniques and procedures, the efficacy and toxicity of the compounds of this invention were studies both in vitro via the Plaque Inhibition Test and in vivo in mice—both with favorable results. Based on these tests, the effective anti-viral dosage of the active ingredient of the compositions of this invention is considered to be within the range of 1 to 50 mg. per kg. of mammalian body weight. This dosage can be given once daily or can be divided and taken at given intervals during the day. The dosage administered will be dependent upon the virus being treated, the age, health and weight of the recipient, the extent of infection, kind of concurrent treatment, frequency of treatment, and the nature of the effect desired.

For purposes of the invention, oral administration is preferred, although, if desired, administration can be parenterally, that is subcutaneously, intravenously, intramuscularly, or intraperitoneally. Administration also can be by vapor or spray through the mouth or nasal passages.

The active ingredient of this invention can be employed in useful compositions according to the present invention in such dosage forms as tablets, capsules, powder packets, or liquid solutions, suspensions, or elixirs, for oral administration of liquid solutions for parenteral use. In such compositions the active ingredient will ordinarily always be present in an amount of at least 0.5% by weight based on the total weight of the composition and not more han 90% by weight.

Besides the active ingredient of this invention, the antiviral composition will contain a solid or liquid non-toxic pharmaceutical carrier for the active ingredient.

In one embodiment of a pharmaceutical composition of this invention, the solid carrier is a capsule which can be of the ordinary gelatin type containing from about 30–60% by weight of a compound of Formula I and 70–40% by weight of a carrier. In another embodiment, the active ingredients is tableted with or without adjuvants. In yet another embodiment, the active ingredient is put into powder packets. In these capsules, tablets and powders, the pharmaceutical carrier will generally constitute from about 5% to about 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such a water and oils, including those of petroleum, animal, vegetable or synthetic origin, for example peanut oil, soybean oil, mineral oil, sesame oil, and the like. In general, water, saline, aqeuous dextrose (glucose) and related sugar solutions and glycols such as propylene glycol or polyethylene glycols are preferred liquid carriers, particularly for injectable solutions. Sterile injectable solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain the present invention:

EXAMPLE 6

A large number of unit capsules are prepared by filling standard two-piece hard gelatin capsules weighing about 50 milligrams each with 50 milligrams of powdered 1-(1-adamantyl)-3-azetidinol hydrochloride, 125 milligrams of lactose and 1 milligram of "Cab-o-sil."

EXAMPLE 7

Example 6 is repeated except that soft gelatin capsules are used and the powdered 1-(1-adamantyl)-3-azetidinol is first dissolved in mineral oil.

EXAMPLE 8

Example 6 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used by applying appropriate coatings. A sugar coating can be applied to increase palatability.

Numerous other variants of the above compounds and processes will be apparent to those skilled in the art within the scope of the present invention.

What is claimed is:

1. A composition of matter having the structural formula:

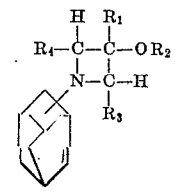

wherein $R_1$ is hydrogen, lower alkyl, or a phenyl radical substituted with a member selected from the group consisting of hydrogen, fluorine, chlorine, bromine, lower alkyl, hydroxy, lower alkoxy and trifluoromethyl; $R_2$ is hydrogen or a pharmaceutically acceptable acyl radical; $R_3$ and $R_4$ are hydrogen or lower alkyl and pharmaceutically acceptable acid addition salts thereof.

2. A composition according to claim 1 wherein $R_1$ is a phenyl radical.

3. A composition according to claim 1 wherein $R_2$ is a lower alkanoyl radical.

4. A composition according to claim 1 wherein $R_1$ is hydrogen.

5. A composition according to claim 1 wherein the adamantyl radical is attached through its 1 carbon atom to the azetidine ring.

6. 1-(1-adamantyl)-3-azetidinol.

7. 1-(1-adamantyl)-3-acetoxyazetidine.

References Cited

Gaertner, J. Org. Chem., vol. 32, pp. 2972–2976 (1967).

ALTON D. ROLLINS, Primary Examiner

U.S. Cl. X.R.

424—244